Nov. 22, 1938.                B. L. DOLBEAR                    2,137,273
                     DIRECTION FINDER CORRECTING LOOP
                           Filed May 22, 1935           2 Sheets-Sheet 1

INVENTOR
BENJAMIN L. DOLBEAR
BY
ATTORNEY

Nov. 22, 1938.                B. L. DOLBEAR                2,137,273
                      DIRECTION FINDER CORRECTING LOOP
                      Filed May 22, 1935          2 Sheets-Sheet 2
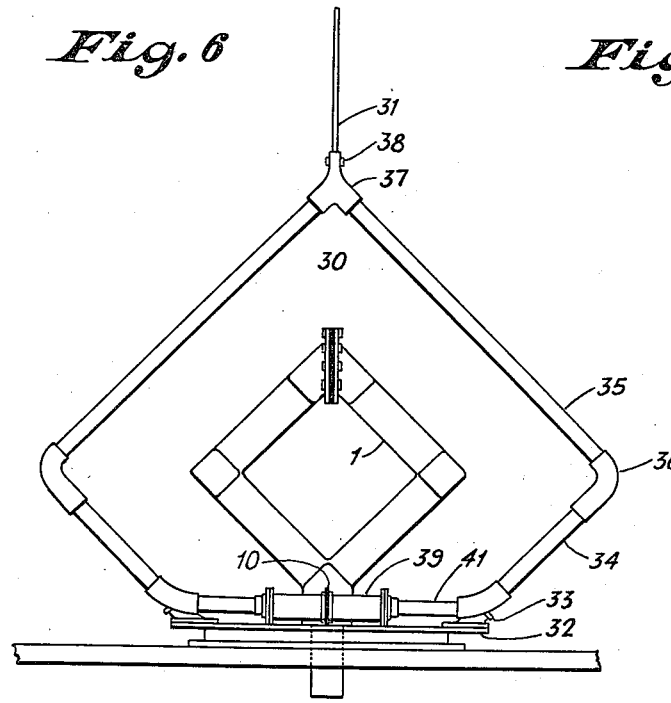
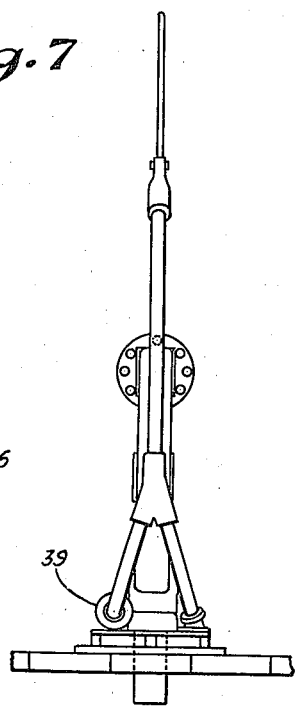
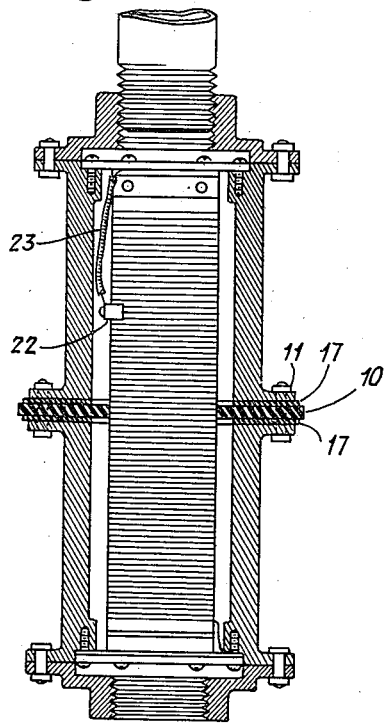
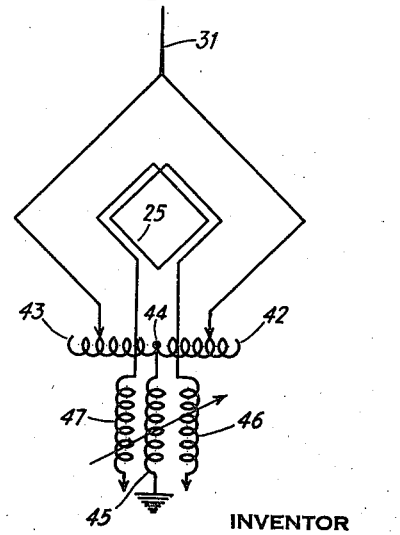
INVENTOR
BENJAMIN L. DOLBEAR
BY
ATTORNEY Patented Nov. 22, 1938

2,137,273

UNITED STATES PATENT OFFICE 2,137,273

DIRECTION FINDER CORRECTING LOOP

Benjamin L. Dolbear, Belmont, Mass., assignor to Radio Corporation of America, a corporation of Delaware Application May 22, 1935, Serial No. 22,715

2 Claims. (Cl. 250—11)

This invention relates to a new and improved radio direction finder loop with compensating means for correcting or reducing loop errors, and it is particularly adapted to aircraft and marine use.

An object of this invention is to provide a new and novel arrangement for loop compensation whereby the structure for the correcting of the quadrantal error in bearings is closely associated with the rotatable loop structure.

Another object of this invention is to provide a rigid waterproof structure for use with a rotatable waterproof and/or metallic shielded loop.

A further object of this invention is the novel method of combining a radio direction finder correcting loop with the balancing and sense antenna in such a manner that the sense antenna will be symmetrically arranged with respect to the rotatable loop.

A feature of this invention is the arrangement of the component parts whereby the correcting loop serves to provide a suitable housing for compensating devices associated with the rotatable direction finder loop.

The use of compensating or correcting metallic members, generally in the form of a wire conductor surrounding or placed adjacent to a direction finder loop, is well known in the prior art. However, such arrangements do not always provide a practical marine or aircraft installation due to mechanical injury to small fragile parts or physical displacement by weather conditions or many other causes encountered by aircraft or marine vessels. Furthermore, in a radio direction finder it is sometimes found desirable to use a vertical antenna or its equivalent in conjunction with a loop antenna to balance out residual voltages in the loop circuit at null areas as well as to produce uni-lateral effects for determining the sense of bearings obtained. A more effective open wire antenna is accomplished by locating a metallic member symmetrically with respect to the direction finder rotatable loop, although in many instances of aircraft and marine installation it is located off to one side of the rotatable loop structure.

It is one of the purposes of my invention to combine the correcting loop and the open antenna in such a manner that they both will be symmetrically located with respect to the rotatable loop. Likewise, in combining the correcting loop and the open antenna I propose to include within a suitably enclosed waterproof housing various compensating elements such as variable inductances, variable capacitances or variable resistances, or a combination of such elements.

This novel correcting loop may be used in addition to the well-known forms of mechanical compensators of the cam type, to provide further and improved correction of errors, or in some cases may be in place of the cam type compensator.

This invention will be more fully understood by referring to the accompanying drawings, in which Fig. 1 is an elevation of a direction finder correcting loop surrounding a rotatable loop;

Fig. 6 is a front elevation of a correcting loop which is combined with a symmetrically arranged open antenna;

Fig. 7 is a side view of Fig. 6;

Fig. 8 is a detail of the lower portion of Figs. 6 and 7, showing the housing for the compensating elements; and Fig. 9 is a diagram of the correcting loop having combined open antenna and the variable compensating elements showing how it is associated with the rotatable loop.

Figure 1:
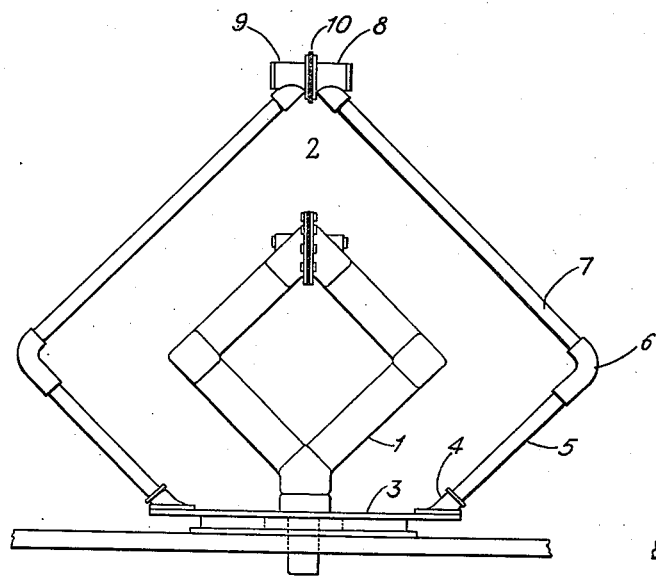
Figure 2:
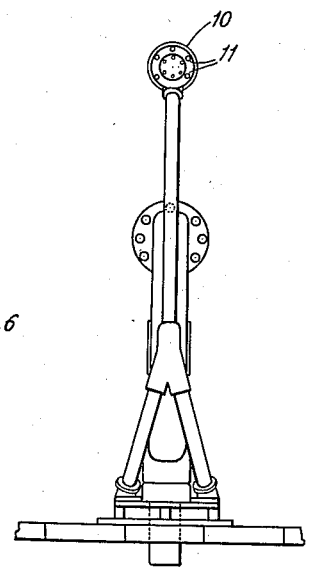
Fig. 2 is a side view of Fig. 1.
Figure 3:
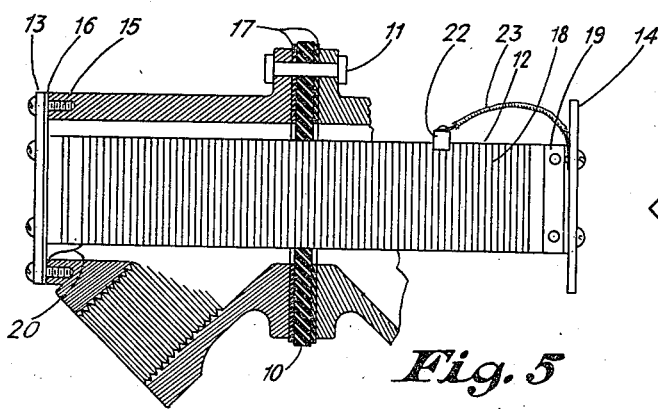
Fig. 3 is a detail of the upper portion of Figs. 1 and 2, showing the housing for enclosing variable compensating elements.
Figure 4:
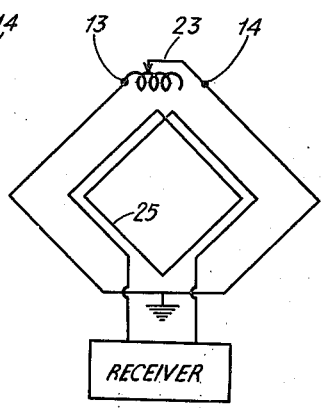
Fig. 4 is a wire diagram of the correcting loop with variable compensating elements showing how it is associated with a rotatable loop.
Figure 5:
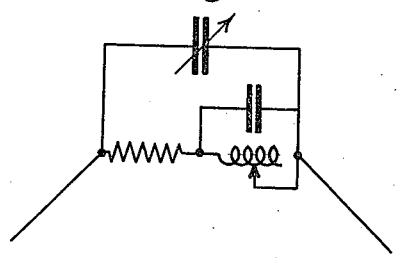
Fig. 5 is a diagram of a combination of fixed and variable compensating elements.

Referring now in detail to the modification shown by Figs. 1, 2, 3, and 4, the rotatable direction finder loop 1 is surrounded by a fixed configuration 2, which may be any desired shape, comprising a base member 3 upon which is located a plurality of supporting members 4 which support and combine the various tubular elements and fittings. The lower tubular metallic members 5 are joined by a fitting 6 to the upper tubular arms 7. At the upper portion of the arms 7 there is located a metallic housing which is divided into two halves 8 and 9 by insulating member 10, the two halves being joined together by means of suitable bolts 11. Within the housing there is located a compensating element or elements 12 which may be in the form of a variable resistance, a variable inductance, or a variable capacitance, or a combination thereof, as shown by Fig. 5. The compensating element is supported at both ends of the housing by means of metallic end members 13 and 14 which are fastened to the housing by means of screws 15. To prevent entry of moisture within the housing, there is provided gaskets 16. Likewise, there is provided suitable gasket material 17 between members 8, 9, and 10. The compensating element shown in Fig. 3 shows an insulating tubing 19, wound with wire 18, the tubing 19 being mechanically secured to the end members 13 and 14. The terminal wire end 20 of the wire 18 is electrically connected to the end member 13. The compensating element 12 is provided with a variable tap 22 connected to end member 14. A typical diagram of the circuit coupling arrangement is shown in Fig. 4. The diagram shown by Fig. 5 shows the combination of fixed and variable compensating elements such as resistances, inductances, and condensers.

In the other modification shown by Figs. 6, 7, 8, and 9, the rotatable loop 1 is surrounded by a rigid waterproof metallic loop correcting member 30 which has combined at its apex a vertical open antenna 31 in the form of a metallic rod or wire having any suitable length. The combined correcting loop and open antenna are supported on an insulating base 32 upon which is located a plurality of supporting feet 33 for securing and locating the tubular members and fittings of correcting loop 30. A lower tubular member 34 is joined to an upper tubular member 35 by means of an elbow fitting 36. The upper portion of the correcting loop is provided with a Y-shaped fitting 37 in which the tubes 35 and the open antenna are joined, the open antenna 31 being fastened to the member 37 by means of a bolt 38. Upon the base 32 and located at one side of the rotatable loop 1 there is a metallic housing 39 which is mechanically connected to the supporting feet 33 by means of tubular members 41. An insulated joint is included in this housing similar to 10 in Fig. 1. The general arrangement and construction of the variable compensating elements located within this housing is similar to that of the modification shown in Fig. 3, except that a mid-tap is included in the winding which is carried down to the receiver for balancing or sense indications.

The circuit diagram shown in Fig. 9 is similar to that of Fig. 4, except an open antenna is directly connected to the correcting loop 35 and is joined with suitable taps to each of the compensating elements 42 and 43, and is centrally connected at a point 44. From this point it is connected to a coupling coil 45, usually located in the receiver, and is variably coupled with the loop coupling coils 46 and 47 for purposes of balancing or sense indications.

Although only two modifications of correcting loops have been shown, it is to be distinctly understood that this invention should not be limited to those modifications shown, as other forms will readily suggest themselves to those skilled in the art.

Having thus described my invention, what I claim is:

1. A radio direction finder antenna comprising a metallic base member electrically connected to ground, a rotatable loop having a vertical shaft passing through said base member, a tubular metallic correcting loop member following the contour of the upper portion of said rotatable loop, the lower portion of said tubular metallic member being branched out and joined by two supporting members each having two separate arms extending downward to support said tubular metallic member on said base member, said tubular metallic member being subdivided at its top, an insulating separation member located at the top of said tubular metallic member to break its electrical continuity, and a variable reactive element electrically connected in series between the subdivided portions broken by said insulating separation member.

2. A radio direction finder antenna comprising a rotatable loop, a metallic loop compensating member surrounding and following the contour of said rotatable loop, said metallic loop compensating member having a gap located at the upper portion thereof and a connection across said gap which is electrically connected in series with a resistance and a variable inductance, a condenser in shunt with said variable inductance, and a variable condenser connected in shunt with said resistance and said inductance.

BENJAMIN L. DOLBEAR.